(12) United States Patent
Tessitore

(10) Patent No.: US 8,714,315 B2
(45) Date of Patent: May 6, 2014

(54) PARKING BRAKES

(75) Inventor: Luigi Tessitore, Savona (IT)

(73) Assignee: Automotive Products Italia (SV) s.r.l. (IT)

( * ) Notice: Subject to any disclaimer, the term of this patent is extended or adjusted under 35 U.S.C. 154(b) by 504 days.

(21) Appl. No.: 10/576,749

(22) PCT Filed: Oct. 18, 2004

(86) PCT No.: PCT/IB2004/003423
§ 371 (c)(1),
(2), (4) Date: Apr. 21, 2006

(87) PCT Pub. No.: WO2005/040632
PCT Pub. Date: May 6, 2005

(65) Prior Publication Data
US 2007/0068743 A1    Mar. 29, 2007

(30) Foreign Application Priority Data

Oct. 22, 2003    (GB) .................................. 0324571.9

(51) Int. Cl.
*F16D 65/14* (2006.01)
(52) U.S. Cl.
USPC ........................................................ 188/2 D

(58) Field of Classification Search
USPC .......................... 188/2 D, 79.58, 79.51–79.64
See application file for complete search history.

(56) References Cited

U.S. PATENT DOCUMENTS 6,502,670 B1 *    1/2003   Asai ............................. 188/2 D
6,802,397 B1 *   10/2004   Matteis et al. ................ 188/2 D

FOREIGN PATENT DOCUMENTS

FR           2599797 A1 *   12/1987   ............. F16D 65/16

* cited by examiner

*Primary Examiner* — Xuan Lan Nguyen
(74) *Attorney, Agent, or Firm* — RatnerPrestia

(57) ABSTRACT

A parking brake is described which has a backplate, first and second brake shoe portions mounted on the backplate, a drum encircling the brake shoe portions, a parking lever pivoted adjacent one end on one of the brake shoe portions, and a strut extending between a first abutment on the parking lever and a second abutment on the other of the brake shoe portions. The backplate includes a viewing opening, and the parking lever and the one brake shoe portion include datum surfaces visible through the viewing opening from which the position of the parking lever relative to the brake shoe portion can be assessed.

9 Claims, 4 Drawing Sheets

PARKING BRAKES

CROSS REFERENCE TO RELATED APPLICATION

This application is the U.S. National Phase Application of PCT International Application No. PCT/IB2004/003423, filed Oct. 18, 2004, which claims priority to Great Britain Patent Application No. 0324571.9, filed Oct. 22, 2003, the contents of such applications being incorporated by reference herein.

BACKGROUND OF THE INVENTION

This invention relates to parking brakes and in particular to parking brakes hereinafter referred to as of the type described which comprise a backplate, first and second brake shoe portions mounted on the backplate, a drum encircling the brake shoe portions, a parking lever pivoted adjacent one end on one of the brake shoe portions, and a strut extending between a first abutment on the parking lever and a second abutment on the other of the brake shoe portions so that operation of a handbrake cable pivots the parking lever relative to said one brake shoe portion so that the parking lever moves from a retracted position to an operative position thus moving the strut which in turn moves the other brake shoe portion away from said one brake shoe portion to bring the shoe portions into contact with the drum thus apply the parking brake. The brake shoe portions may be provided by separate brake shoes as in a normal twin shoe brake or by opposite end portions of a single generally U-shaped shoe of the form disclosed in, for example, EP392829 or WO99/53212, incorporated by reference herein.

Parking brakes of the type described may also form part of a drum brake which provides a parking brake function only or also provides a service brake function or may form part of a drum-in-disc brake in which a radially inner parking brake drum is surrounded by a brake disc on which a disc brake caliper acts to provide the service brake function.

Parking brakes of the type described are well known and generally work efficiently. However, problems can arise in correctly adjusting the length of the connecting cable/cable tensioning when the vehicle is being assembled on the production line. This can result in vehicles leaving the production line with an excessive amount of travel of the handbrake lever before the parking brake is correctly applied.

Also problems can arise if the brake shoe mounted parking lever does not retract correctly to its retracted position when the parking brake is released leading to the brake remaining partly applied and dragging on the associated drum causing unwanted noise and possibly also generating unwanted heat.

SUMMARY OF THE INVENTION

It is an aspect of the present invention to provide an improved form of parking brake of the type described in which the problems of cable adjustment and parking lever retraction are ameliorated.

Thus according to aspects of the present invention there is provided a parking brake of the type described in which the backplate includes a viewing opening and the parking lever and said one brake shoe portion include datum surfaces visible through the viewing opening from which the position of the parking lever relative to said one brake shoe portion can be assessed, thus enabling verification that the cable is applying force to the parking lever when the parking brake is released and is therefore tensioned to a predetermined level.

Preferably spring means act between the parking lever and said one brake shoe portion to tend to retract the parking lever to its retracted position.

The parking brake of the present invention thus ensures that the connecting cable is correctly tensioned and no slack exists in the cable when the brake is released. Also the provision of the spring means between the parking lever and said one brake shoe portion helps to ensure that when the parking brake is released the brake shoe portions are correctly retracted and do not drag on the drum.

If the parking brake is provided with a quick-attach facility for connecting the cable to the parking lever, the viewing opening is preferably located so that when the parking lever is released the position of an end nipple on the cable is visible allowing confirmation that the nipple is correctly connected with the parking lever.

The viewing opening preferably has a removable cover to allow closing of the opening when the brake is in use.

Preferably the datum surfaces are provided by an abutment on the parking lever designed to contact an edge of said one brake shoe portion when the parking lever is in its fully retracted position and the parking lever includes an aperture through which the position of said abutment relative to said edge is visible through the viewing opening.

The aperture preferably allows the insertion of a measuring device (e.g. a feeler gauge) between the abutment and edge to check more accurately the position of the parking lever relative to said brake shoe portion.

Typically the abutment is designed to be spaced a given distance (e.g. 1 mm) from the edge of the brake shoe portion when the handbrake lever is in a predetermined released position thus ensuring that the cable is correctly tensioned and no slack exists in the cable.

The abutment on the parking lever may conveniently comprise a tang bent out of the parking lever.

Preferably the spring means is a coil spring with end hooks which hook around the parking lever and said one brake shoe portion respectively.

The present invention also provides a method of testing that the operating cable of parking brake in accordance with the present invention is adjusted within specified limits comprising:

positioning the handbrake lever in a predetermined released position;

viewing (measuring) the spacing between datum surfaces through the viewing opening to establish that the parking lever is within a predetermined range of positions relative to said one brake shoe portion thereby indicating that with the parking brake released the cable is in tension and there is no cable slack between the handbrake lever and the parking lever.

Preferably a feeler gauge or other measuring device is inserted between the datum surfaces via the viewing opening to establish the position of the parking lever.

BRIEF DESCRIPTION OF THE DRAWINGS

The present invention will now be described, by way of example, with reference to the accompanying drawings in which.

DETAILED DESCRIPTION OF THE INVENTION

Figure 1:
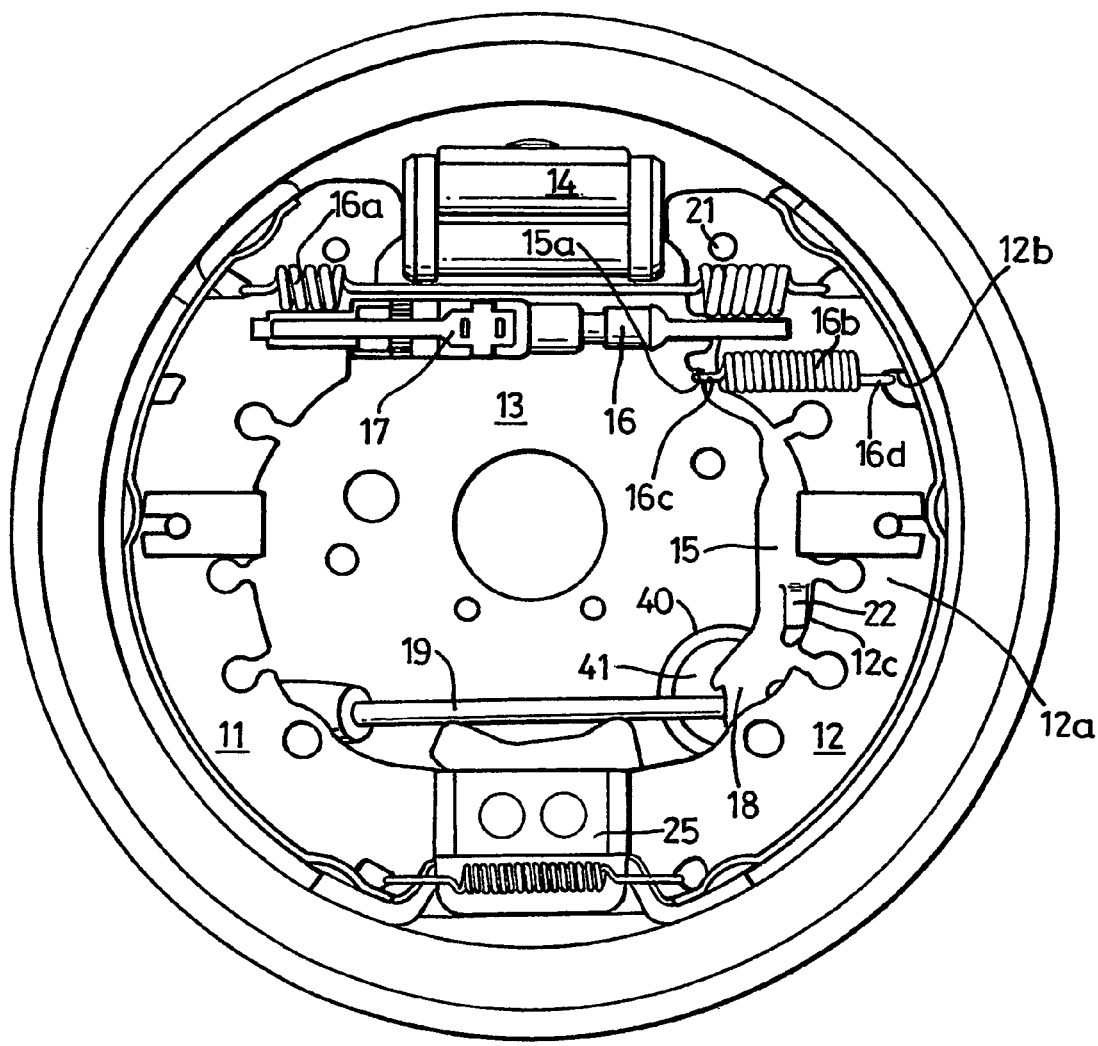
FIG. 1 is a front view of a drum brake which includes a parking brake in accordance with the present invention.

Referring to FIG. 1 this shows a drum brake in which two brake shoes 11 and 12 are mounted on a backplate 13 for operation by a hydraulic wheel cylinder 14 to engage an encircling drum (not shown) to provide a service brake function in the known manner. A parking brake function is also provided in which clockwise pivoting (as viewed in FIG. 1) of a parking lever 15 about a pin 21 carried by shoe 12 applies both shoes to the brake drum via a strut 16 which extends between the shoes. A pull-off spring 16a acts between the shoes 11 and 12 and the effective length of strut 16 is adjusted by the parking brake adjusting mechanism which is generally indicated at 17 and is built into strut 16. An example of a suitable adjuster mechanism is fully described in the Applicant's European patent number 0388057.

A retraction spring 16b acts between the parking lever 15 and the web 12a of shoe 12. The spring has end hooks 16c and 16d which engage a notch 15a or other suitable abutment on lever 15 and an aperture 12b in web 12a of shoe 12 and tend to bias the lever 15 to its retracted position in which a tang 22 bent out of lever 15 contacts with edge 12c of web 12a.

The lower end of parking brake lever 15 is of U-shaped cross section forming a channel 18 (see FIG. 2) for the reception of the end of a handbrake operating cable 19 which has an end fitting in the form of a nipple 20. The cable may be operated by a manual driver-operated handbrake lever or by an electrical actuator as disclosed in, for example, FIG. 8 of the Applicant's co-pending Application No, PCT/GB03/003912.

Figure 2:
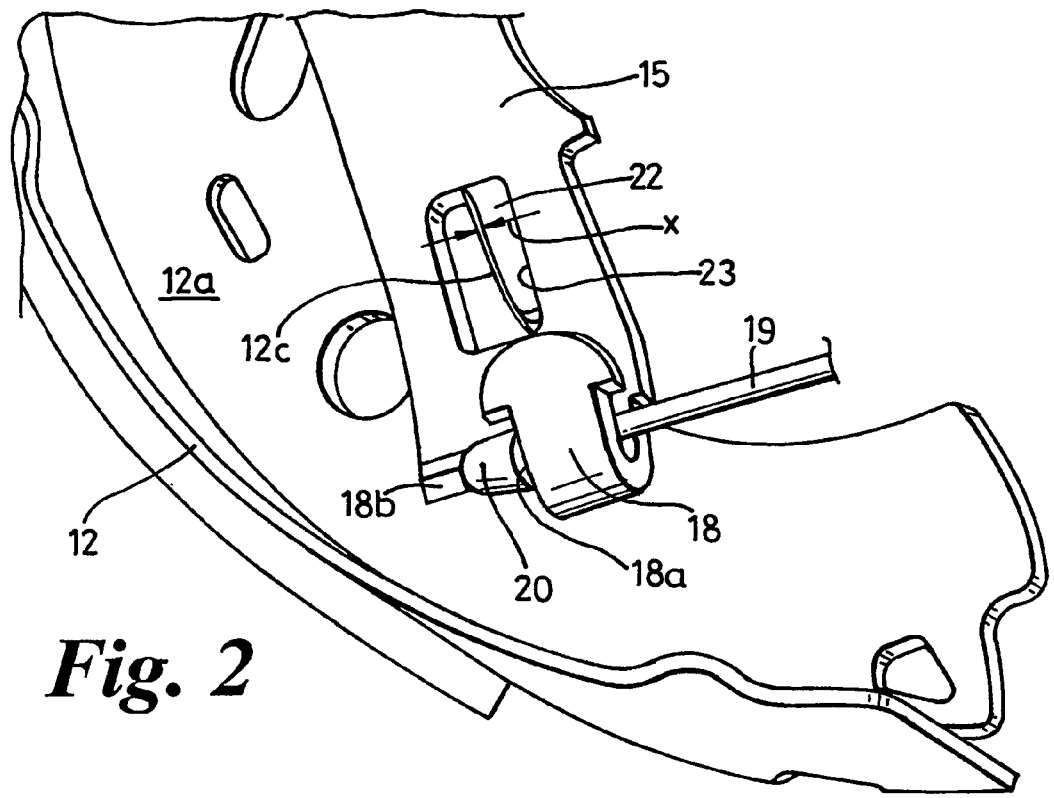
FIG. 2 shows a perspective view on a larger scale of the shoe mounted parking lever arrangement of the brake of FIG. 1.
Figure 3:
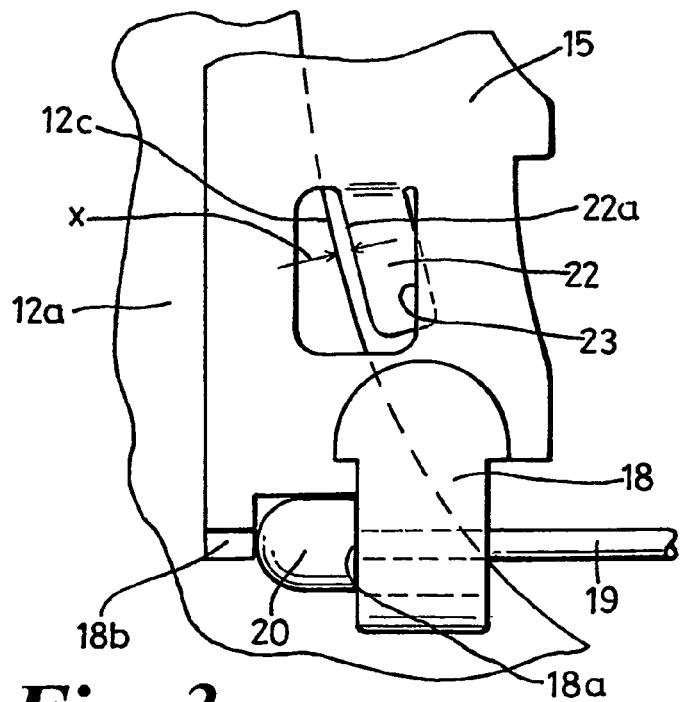
FIG. 3 shows diagrammatically the lever arrangement of FIG. 2.

In the arrangement shown in FIGS. 1 to 3 the nipple 20 is manually engaged with the edge 18a of channel 18 and prevented from disengagement with channel 18 by projection 18b which engages behind the head of nipple 20 (see FIG. 2).

As will be appreciated the present invention is useable with so-called quick-attach arrangements for connecting nipple 20 with channel 18. For example, the Applicant's UK Patent No. 2328257 or PCT Application No. PCT/GB03/003310 disclose suitable forms of quick-attach arrangements.

Figure 4:
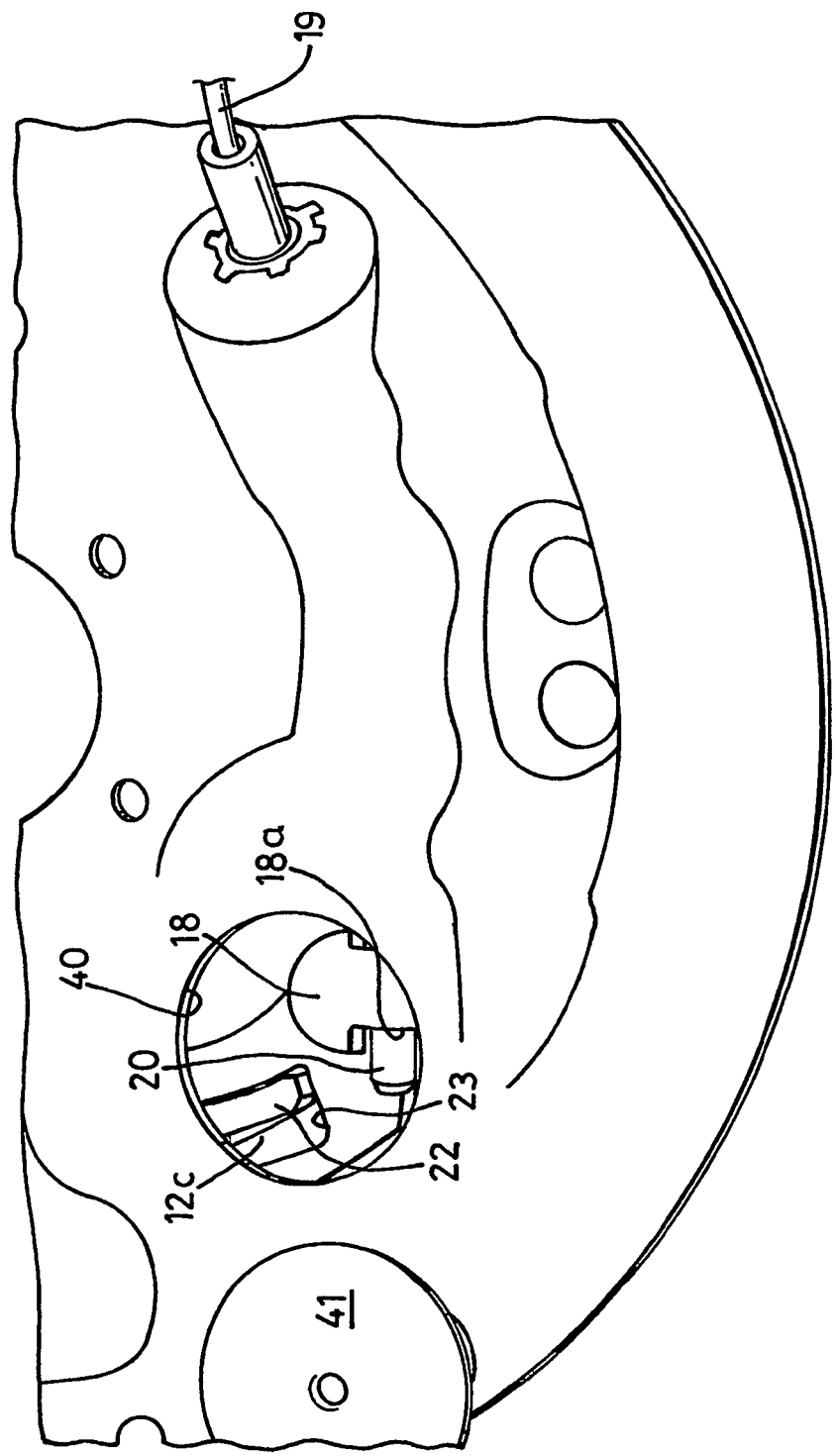
FIG. 4 shows a rear view of the brake of FIG. 1 with the cover over the viewing opening removed.

In accordance with the present invention the backplate 13 is provided with a viewing opening 40 (see FIG. 4) which is closed by a plastics snap-fit cover 41 when the brake is in use. Opening 40 is located so that, with cover 41 removed and the parking brake released, an operator can check the position of tang 22 with respect to the edge 12c of shoe web 12a via an aperture 23 formed in lever 15 through which edge 12c of shoe web 12a is visible and accessible.

Typically, when cable 19 has been attached to lever 15 either manually or using a quick-attach arrangement, the cable is actuated several times to bed-in the mechanism and the length of the cable is then adjusted (e.g. using a conventional nut adjustment at the drivers handbrake lever end of the cable or any other suitable adjuster located anywhere in the mechanism) so that when the handbrake lever is in a predetermined released position the tension in the cable is such that a predetermined spacing 'x' (see FIGS. 2 and 3) exists between the edge 22a of the tang 22 and the edge 12c of shoe web 12a. This spacing (which is typically of the order of 1 mm) can be checked using a feeler gauge or other measuring device inserted via opening 40 and ensures that there is no slack in the parking brake mechanism.

This spacing 'x' is chosen to correspond with a predetermined shoe clearance at the drum to ensure that the shoes do not drag on the drum.

The release of the brake is also assisted by the use of retraction spring 16b. This spring arrangement which does not act on strut 16 is particularly useful when used with a strut 16 which includes a brake adjusting mechanism 17 of the type described in the previously referred to Applicant's European Patent No. 0388057 which relies on the relative axial movement of various parts of strut 16 which would be adversely affected if spring 16b was axially loading parts of strut 16.

Also, if a quick-attach arrangement is used to connect cable 19 to lever 15, as indicated above, the viewing opening 40 gives visual confirmation that the cable end fitting 20 is correctly latched to the lever 15.

Figure 5:
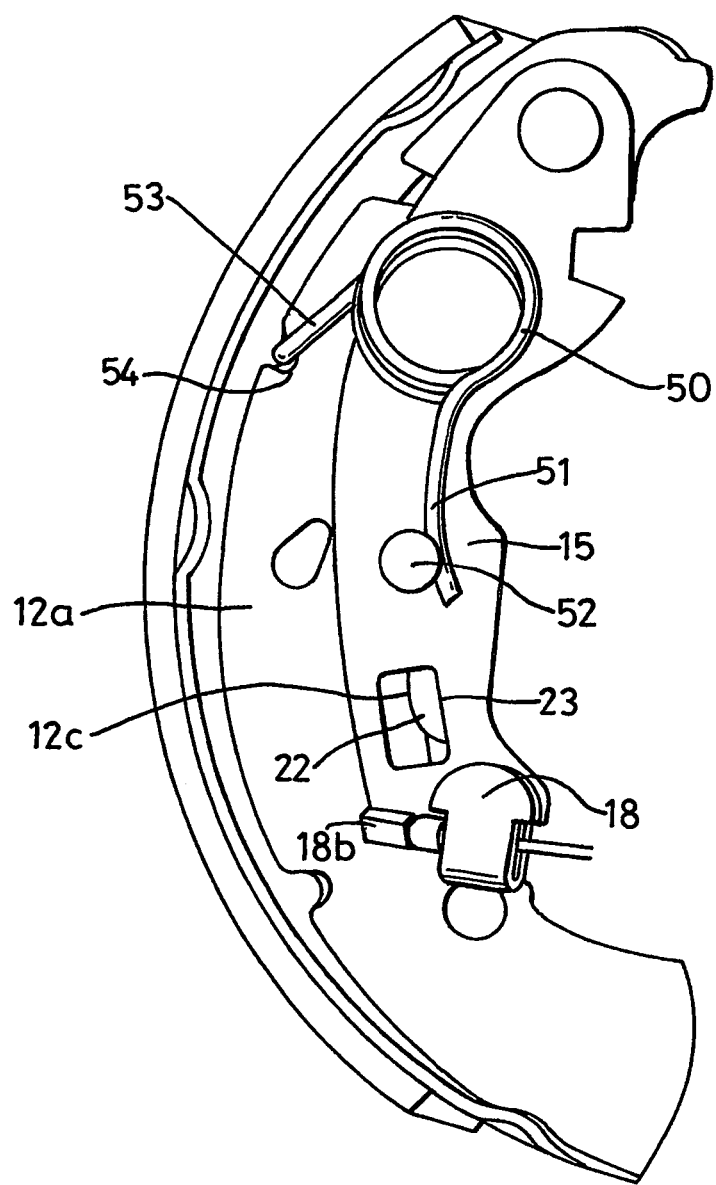
FIG. 5 shows an alternative form of parking lever return spring.

FIG. 5 shows an alternative parking brake lever return spring arrangement in which a loop-type spring 50 has an end 51 which acts against an abutment 52 on lever 15 and a second end 53 which extends through a hole 54 in the shoe web 12a to bias tang 22 towards shoe web edge 12c.

Although the invention has been described above in relation to a drum brake which provides both a service and parking function it is equally applicable to a drum brake which provides only a parking function and in which, for example, wheel cylinder 14 is replaced by a fixed abutment. Similarly the strut 16 may be rigid and the parking brake adjusting mechanism could be provided manually or automatically between the lever ends of shoes 11 and 12 in place of fixed abutment 25. A suitable form of automatic adjuster for use in place of fixed abutment 25 is disclosed, for example, in FIGS. 9 to 15 of Applicant's co-pending PCT Application No. PCT/GB03/003912.

The invention claimed is:

1. A parking brake comprising:
a parking lever having a radial surface and an axial surface;
a brake shoe portion having a radial surface opposing the radial surface of the parking lever; and
a backplate having a viewing opening, the viewing opening making the brake shoe portion radial surface visible and accessible via an aperture formed in the parking lever, the aperture axially overlapping with the brake shoe portion radial surface, and
wherein spring means act between the parking lever and the brake shoe portion to cause the parking lever to retreat to a predetermined retracted position.

2. A parking brake according to claim 1 wherein a quick-attach facility is provided for connecting a cable to the parking lever, the viewing opening overlapping with the parking lever radial surface and the brake shoe portion radial surface, such that the position of an end nipple on the cable is visible through the viewing opening.

3. A parking brake according to claim 1 wherein the viewing opening has a removable cover to allow closing of the opening when the brake is in use.

4. A parking brake according to claim 1 wherein the radial surface of the parking lever is provided by an abutment on the parking lever positioned to contact the brake shoe portion radial surface when the parking lever is in a predetermined retracted position and the parking lever includes said aperture through which the position of said abutment relative to said brake shoe portion radial surface is visible through the viewing opening.

5. A parking brake according to claim 4 for use with a measuring device wherein the aperture has a size sufficient to enable insertion of the measuring device between the abutment and the brake shoe portion radial surface.

6. A parking brake according to claim 1 wherein the spring means is a coil spring with end hooks which hook around the parking lever and the brake shoe portion respectively.

7. A parking brake according to claim 1 wherein the spring means is a loop type spring with ends which act between abutments on the parking lever and the brake shoe portion respectively.

8. A parking brake according to claim 1, wherein the radial surface of the parking lever is formed by a tang, and at least a portion of the tang does not axially overlap the aperture.

9. A method of testing that an operating cable of a parking brake according to claim 1, is adjusted within specified limits comprising:
  positioning a handbrake lever in a predetermined released position; and
  viewing the spacing between the radial surfaces of the parking lever and the brake shoe portion through the viewing opening to establish that the parking lever is within a predetermined range of positions relative to the brake shoe portion.

\* \* \* \* \*